(12) United States Patent
Kuo

(10) Patent No.: US 8,610,887 B1
(45) Date of Patent: Dec. 17, 2013

(54) METHOD FOR TESTING OPTICAL FIBER CONNECTOR

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/858,079

(22) Filed: Apr. 7, 2013

(30) Foreign Application Priority Data

Sep. 21, 2012 (TW) .............................. 101134643 A

(51) Int. Cl.
*G01N 21/00* (2006.01)
(52) U.S. Cl.
USPC .......................................... 356/73.1; 356/72
(58) Field of Classification Search
USPC ....................................................... 356/73.1
See application file for complete search history.

(56) References Cited

U.S. PATENT DOCUMENTS 5,530,546 A * 6/1996 Barringer et al. ............. 356/73.1
7,192,195 B2 * 3/2007 Turner ............................ 385/55

* cited by examiner

*Primary Examiner* — Tarifur Chowdhury
*Assistant Examiner* — Omar Nixon
(74) *Attorney, Agent, or Firm* — Atlis Law Group, Inc.

(57) ABSTRACT

A method for testing if an optical fiber is precisely positioned on a jumper is provided. The jumper includes a main body defining a through hole. The optical fiber is positioned in the main body and has a coupling end inserting through the first through hole. A testing device including a slat defining a second through hole is provided. A diameter of the second through hole is equal to a sum of a diameter of the first through hole and the position tolerance of the optical fiber. The testing device is located on the jumper such that the second through hole is aligned with the first through hole. It is determined that the optical fiber is precisely positioned on the jumper if all of the coupling end is seen through the second through hole along a depth direction.

2 Claims, 3 Drawing Sheets

METHOD FOR TESTING OPTICAL FIBER CONNECTOR

BACKGROUND

1. Technical Field

The present disclosure relates to optical fiber connectors and, particularly, to a method for testing if an optical fiber of an optical fiber connector is precisely positioned.

2. Description of Related Art

Optical fiber connectors include photoelectric elements, jumpers, and optical fibers. It is required that the optical fibers are positioned precisely on and are fixed to the jumper to ensure that the optical fibers are optically coupled to the photoelectric elements, respectively. As such, the photoelectric elements, such as laser diodes and photo diodes, can emit light to or receive light from the respective optical fibers without or with less insertion loss. Therefore, a test is required after the optical fibers are fixed to the jumper to determine if the optical fibers are precisely positioned. However, at present, the test often requires complicated apparatuses and consumes lots of time.

Therefore, it is desirable to provide a method, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
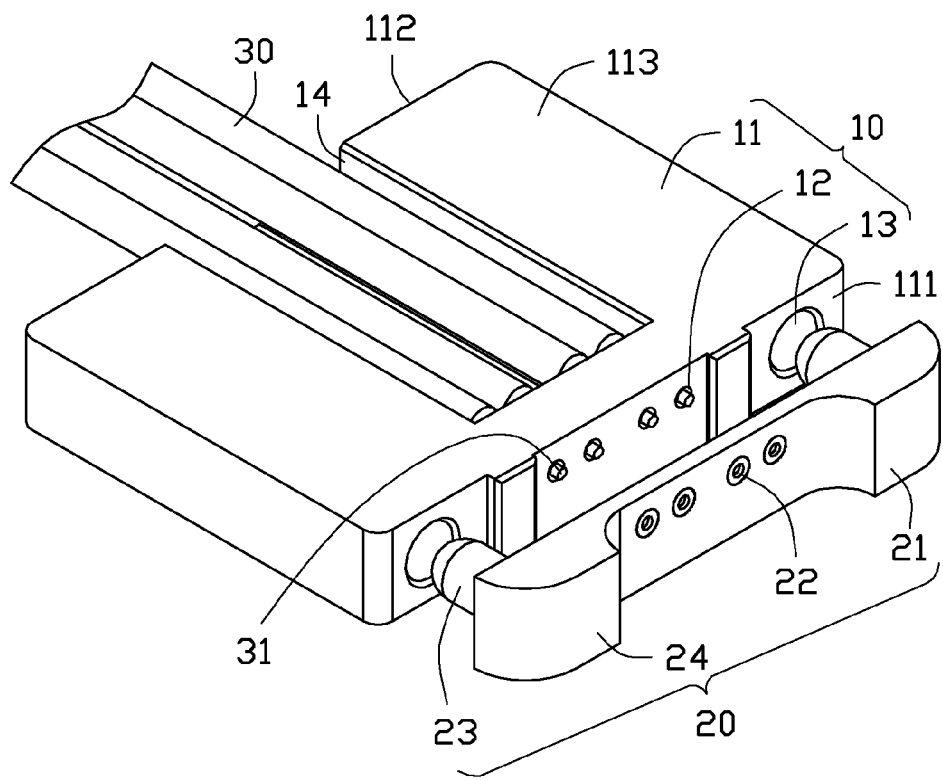
FIG. 1 is an isometric schematic view of an optical connector and a testing device, according to an embodiment.

FIG. 1 illustrates a method, for testing if four optical fibers 30 are precisely positioned on a jumper 10, according to an embodiment.

The jumper 10 includes a substantially rectangular main body 11. The main body 11 includes a front surface 111, a back surface 112 opposite to the front surface 111, and a top surface 113 perpendicularly connecting the front surface 111 and the back surface 112.

The jumper 10 defines a positioning groove 14 in the top surface 113, extending along a direction that is substantially perpendicular to the front surface 111 and through the back surface 112.

The jumper 10 also defines four first through holes 12 in the front surface 111, extending along the direction that is substantially perpendicular to the front surface 111 to communicate with the positioning groove 14. In this embodiment, the four first through holes 12 are arranged in a line that is parallel with the top surface 113.

The jumper 10 further defines two locating holes 13 in the front surface 111, positioned at two opposite sides of the first through holes 12.

The optical fibers 30 are positioned in the positioning groove 14. Each of the optical fibers 30 has a coupling end 31 extending through one of the first through holes 12.

The jumper 10 and the optical fibers 30 are parts of an optical fiber connector, which may further includes four photoelectric elements (not shown), such as laser diodes or photo diodes, and an optical-electric lens (OE lens) element (not shown) which may have lenses and is arranged such that the lenses are precisely aligned with the photoelectric elements and the optical fibers 30 (i.e., the coupling ends 31), provided that the optical fibers 30 are precisely positioned on the jumper 10. Thus, the photoelectric elements can emit (laser diode) or receive (photo diode) light via the lenses to reduce insertion loss.

In other alternative embodiments, the configuration of the optical fibers 30 (e.g., number and position) can be set depending on requirements. For example, only one optical fiber 30 can be employed.

The method includes the following steps S01-S03.

In step S01, a testing device 20 is provided. The testing device 20 includes a slat 21. The testing device 20 defines four second through holes 22 extending through the slat 21, corresponding to the four first through holes 12 in shape and position. The testing device 20 includes two locating pins 23 extending out from two opposite ends of the slat 21 substantially along a depth direction of the second through holes 22, corresponding to the locating holes 13 in shape and position. A diameter of the second through holes 22 is substantially equal to a sum of the diameter of the first through holes 12 and the position tolerance of the optical fibers 30. The testing device 20 can also include two reinforcing blocks 24 bulging up from the two opposite ends of the slat 21 at an opposite side of the locating pins 23.

In step S02, the testing device 20 is detachably attached to the jumper 10 by fitting the locating pins 23 into the locating holes 23 such that the second through holes 22 are aligned with the first through holes 12.

Figure 2:
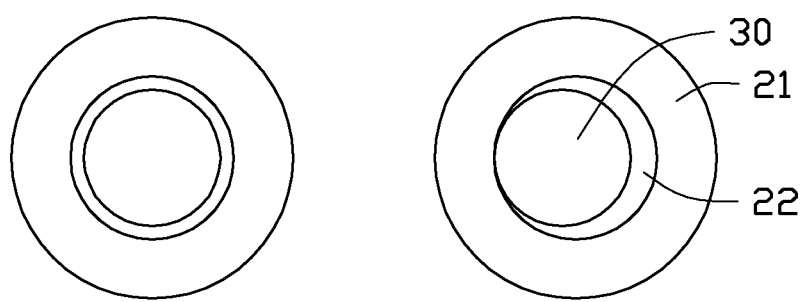
FIGS. 2-3 are planar schematic views showing results of a test.
Figure 3:
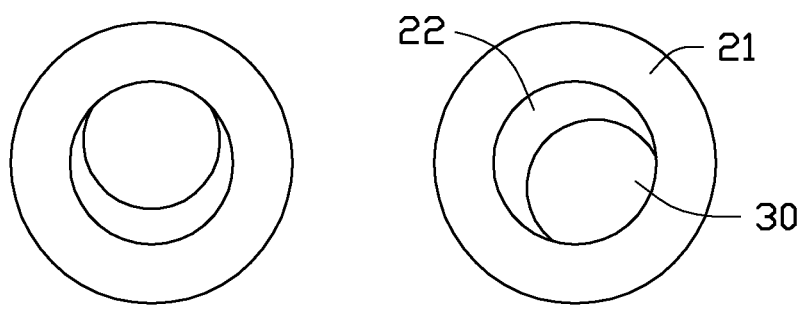

In step S03, if the optical fibers 30 are precisely positioned is determined by visual inspection. In detail, inspectors can look into the second through holes 22 along the depth direction of the through holes 22. If a whole contour of the coupling end 31 of the optical fiber 30 can be seen, then it is determined that the optical fiber 30 is precisely positioned (see FIG. 2), otherwise, it is determined that the optical fiber 30 is not precisely positioned (see FIG. 3).

As such, the test can be carried out conveniently and efficiently, without a need of complicated apparatuses.

The locating holes 13 and the locating pins 23 cooperate to assist the testing device 20 to be precisely located on the jumper 10. In other embodiments, the locating holes 13 can be replaced by another suitable first locating structure, and the locating pins 23 can be replaced by another suitable second locating structure. For example, the first locating structure can be three pins while the second locating structure can be three holes corresponding to the three pins.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A method for testing of an optical fiber precisely positioned on a jumper, the jumper comprising a main body, the main body comprising a front surface, a back surface opposite to the front surface, and a top surface perpendicularly connecting the front surface and the back surface, the jumper defining a positioning groove in the top surface, running along a direction that is substantially perpendicular to the front surface and through the back surface, the jumper also defining a first through hole in the front surface, extending along that direction that is substantially perpendicular to the front surface to communicate with the positioning groove, the jumper forming a first locating structure in the front surface, the optical fiber positioned in the positioning groove and having a coupling end inserting through the first through hole, the method comprising:

providing a testing device, the testing device comprising a slat and defining a second through hole in the slat and corresponding to the first through hole in shape and position, a diameter of the second through hole being equal to a sum of a diameter of the first through hole and the position tolerance of the optical fiber, the testing device also comprising a second locating structure;

locating the testing device on the jumper by engagement between the first locating structure and the second locating structure such that the second through hole is aligned with the first through hole; and determining that the optical fiber is precisely positioned when a whole contour of the coupling end of the optical fiber is seen through the second through hole along a depth direction of the second through hole.

2. The method of claim 1, wherein the first locating structure comprises two locating holes positioned in the front surface at two opposite sides of the first through hole, and the second locating structure comprises two locating pins protruding out from the slat and corresponding to the two locating holes in shape and position.

\* \* \* \* \*